US010229604B1

(12) United States Patent
Mogford et al.

(10) Patent No.: US 10,229,604 B1
(45) Date of Patent: Mar. 12, 2019

(54) FLIGHT AWARENESS COLLABORATION TOOL (FACT)

(71) Applicant: The United States of America as Represented by the National Aeronautics and Space Administration (NASA), Washington, DC (US)

(72) Inventors: Richard Hugh Mogford, Redwood City, CA (US); Cody Allan Evans, San Jose, CA (US)

(73) Assignee: The United States of America as Represented by the Administrator of the NASA, Washington, DC (US)

( * ) Notice: Subject to any disclaimer, the term of this patent is extended or adjusted under 35 U.S.C. 154(b) by 19 days.

(21) Appl. No.: 15/639,807

(22) Filed: Jun. 30, 2017

Related U.S. Application Data

(60) Provisional application No. 62/357,636, filed on Jul. 1, 2016.

(51) Int. Cl.
*G06F 17/30* (2006.01)
*G08G 5/00* (2006.01)
*G09G 5/14* (2006.01)
*G06F 3/0481* (2013.01)
*G06F 3/0482* (2013.01)

(52) U.S. Cl.
CPC ......... *G08G 5/0026* (2013.01); *G06F 3/0482* (2013.01); *G06F 3/04817* (2013.01); *G09G 5/14* (2013.01); *G09G 2354/00* (2013.01); *G09G 2380/12* (2013.01)

(58) Field of Classification Search
CPC . G06F 3/04817; G06F 3/0482; G08G 5/0026; G08G 5/14; G09G 2380/12; G09G 2354/12; G09G 2354/00
USPC ........................................................ 715/758
See application file for complete search history.

(56) References Cited

U.S. PATENT DOCUMENTS

| 8,706,552 | B1 * | 4/2014 | Benjamin | G06Q 30/0261 705/14.4 |
| 2009/0118998 | A1 * | 5/2009 | Chau | G06Q 30/00 701/120 |
| 2009/0287701 | A1 * | 11/2009 | Breaker | G06F 17/3089 |
| 2011/0022294 | A1 * | 1/2011 | Apley | G01W 1/00 701/532 |
| 2017/0320589 | A1 * | 11/2017 | Moravek | B64D 45/00 |

\* cited by examiner

*Primary Examiner* — Scott T Baderman
*Assistant Examiner* — Hassan Mrabi
(74) *Attorney, Agent, or Firm* — Rhys W. Cheung; Robert M. Padilla; Mark P. Dvorsack

(57) ABSTRACT

A software tool assists airline dispatchers and other professionals in management of winter weather events at airports. The flight awareness collaboration tool (FACT) may gather pertinent weather information, air traffic information, airport information, and any other suitable information onto one display screen. FACT can be used by airline dispatchers to manage the airline fleet prior to during the day of a winter weather event, and may have built-in automation tools that can predict the impact of winter weather on airport capacity. FACT may be designed to support collaboration between the airline dispatcher, the air traffic control tower, the airport authority, and de-icing operators on the ground.

18 Claims, 22 Drawing Sheets

FIG. 4C
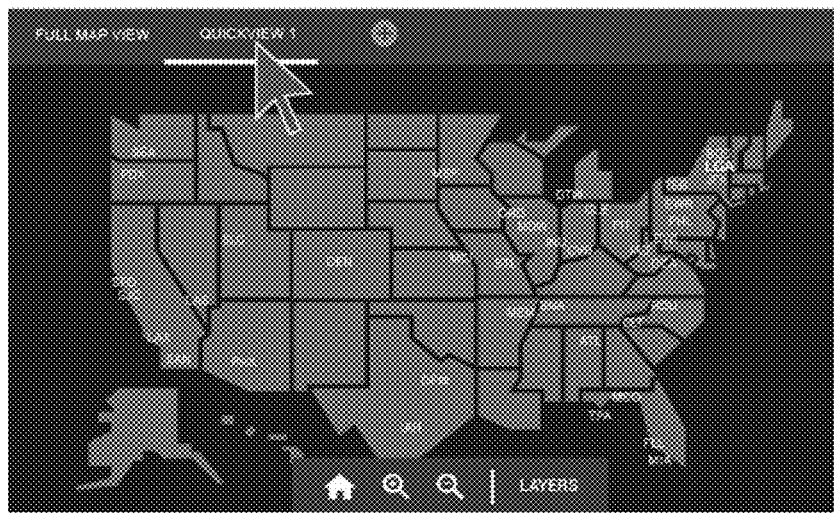
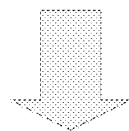
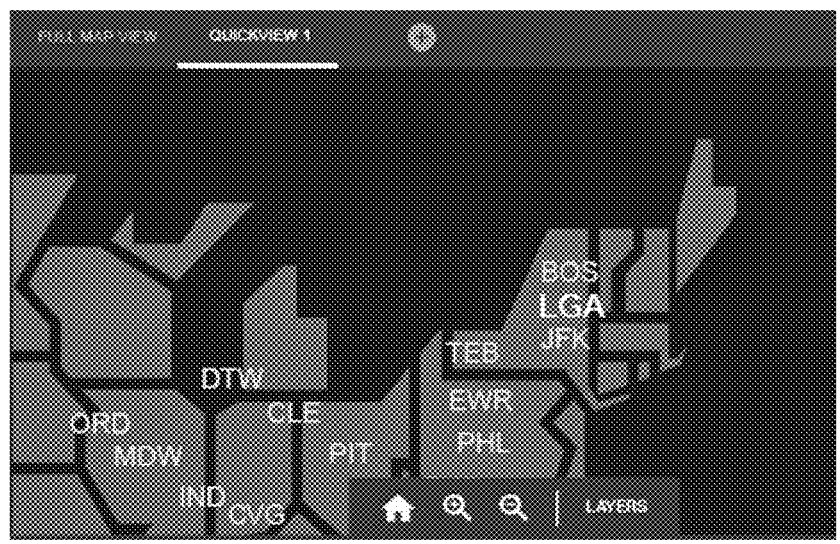

FIG. 5B

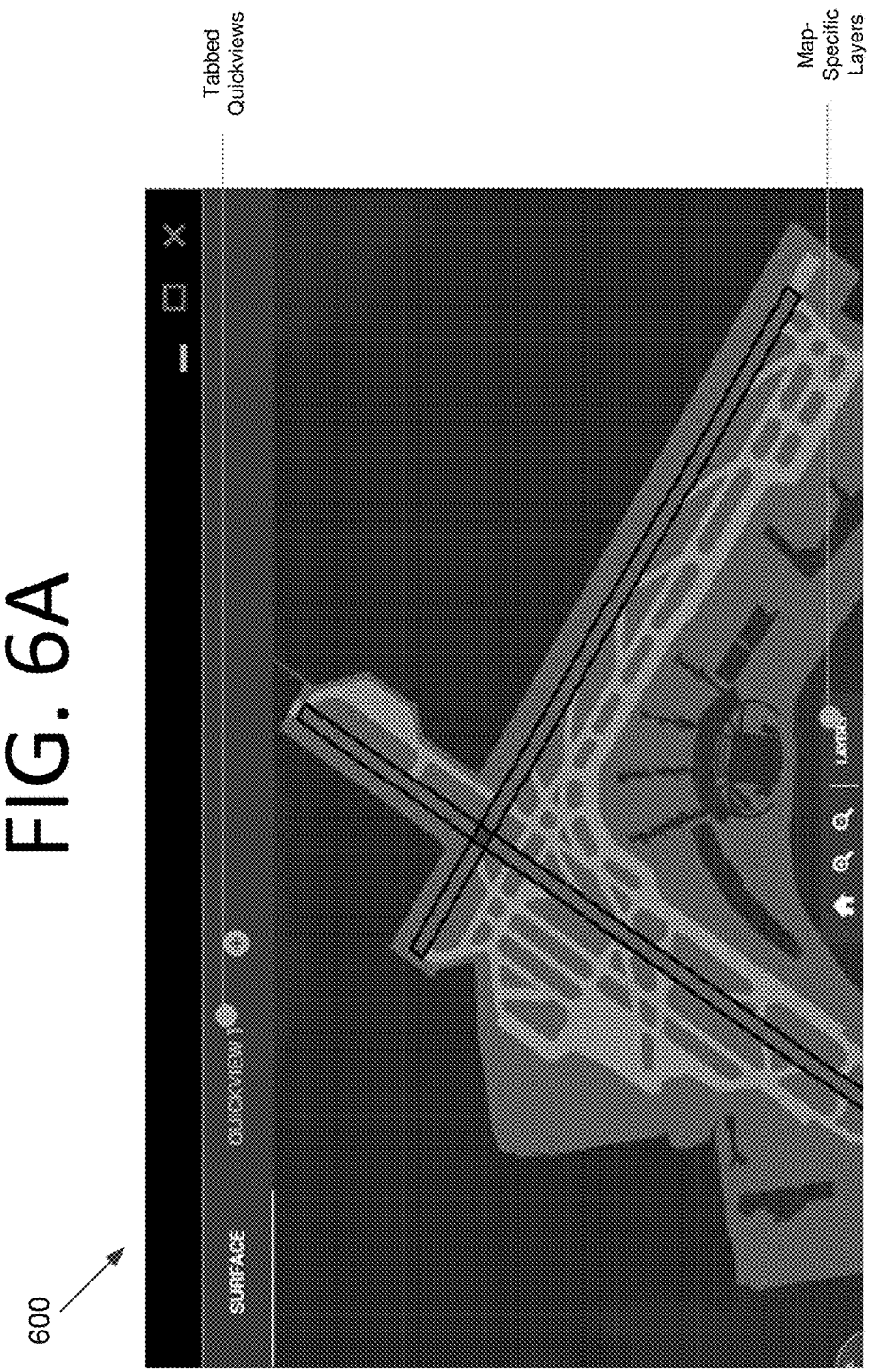

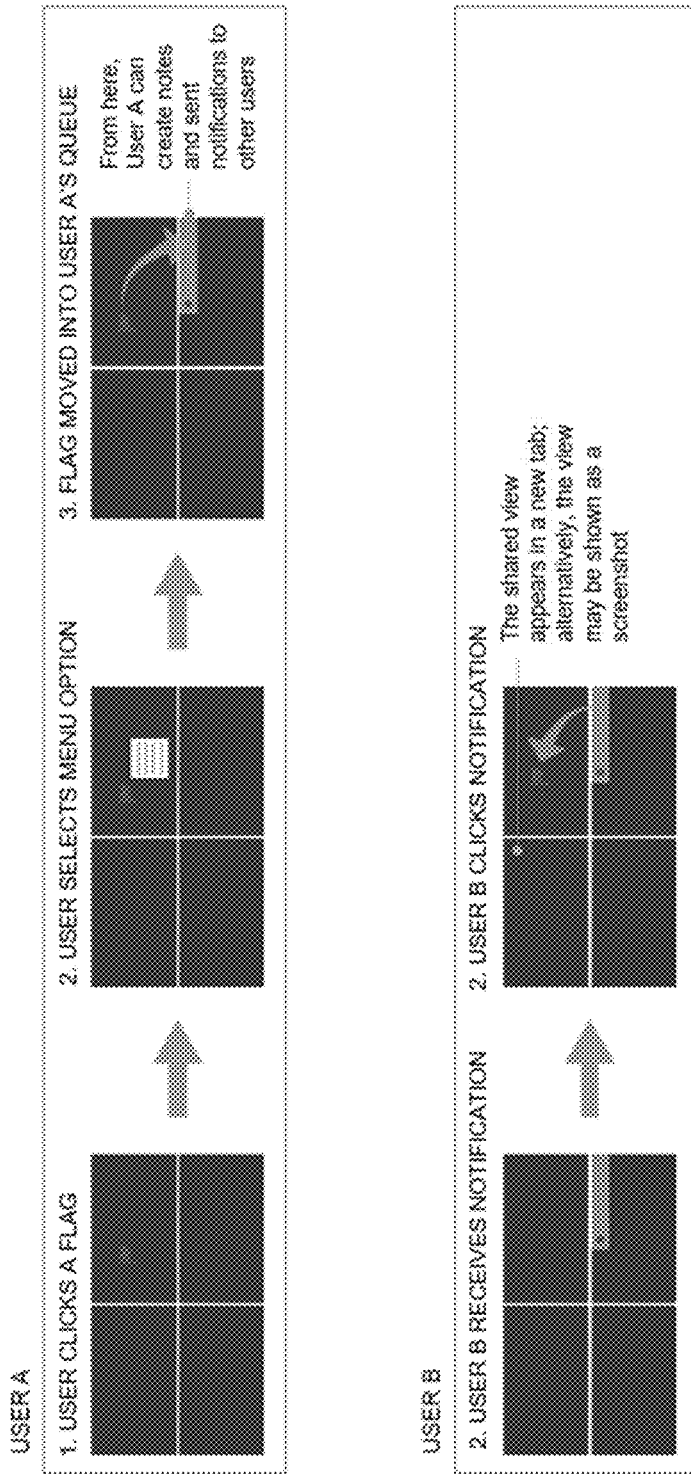

FLIGHT AWARENESS COLLABORATION TOOL (FACT)

CROSS-REFERENCE TO RELATED APPLICATIONS

This application claims the benefit of U.S. Provisional Patent Application No. 62/357,636 filed Jul. 1, 2016. The subject matter of this earlier filed application is hereby incorporated by reference in its entirety.

ORIGIN OF THE INVENTION

The invention described herein was made by employees of the United States Government and may be manufactured and used by or for the Government of the United States of America for governmental purposes without the payment of any royalties thereon or therefore.

FIELD

The present invention generally pertains to flight management, and more specifically, to a software tool that assists airline dispatchers and other professionals in management of winter weather events at airports.

BACKGROUND

The airport surface can be a major constraint on the throughput of the National Airspace System. Winter weather can impact airport surface operations as snow, freezing precipitation, and icing may result in significant disruptions in arrival and departure rates, or even entirely halt airport operations in some cases. Accordingly, a tool that helps to improve situational awareness and reduce the number of unnecessary flight cancellations may be beneficial.

SUMMARY

Certain embodiments of the present invention may provide solutions to the problems and needs in the art that have not yet been fully identified, appreciated, or solved by conventional flight management technologies. For example, some embodiments of the present invention pertain to a software tool that assists airline dispatchers and other professionals in management of winter weather events at airports.

In an embodiment, a computer program is embodied on a non-transitory computer-readable medium. The program configured to cause at least one processor to display a plurality of interactive panes providing information pertinent to winter weather events to a user. The plurality of interactive panes include a primary map pane, a surface map pane, an advisory pane, and a messaging pane in a quadrant layout. The primary map pane includes a geographic map of a geographical region with airport designations. The surface map pane includes a surface map of an airport. The advisory pane includes advisories pulled from at least one air traffic or weather-related source and the messaging pane includes messages between groups of users.

In another embodiment, a computer-implemented method includes displaying, by a computing system, a plurality of interactive panes providing information pertinent to winter weather events to a user. The plurality of panes include a primary map pane, a surface map pane, an advisory pane, and a messaging pane in a quadrant layout. The primary map pane includes a geographic map of a geographical region with airport designations and a layer menu including options for displaying aircraft targets, PIREPS, fixes, icing information, base reflectivity, radar information, satellite views, or any combination thereof. The surface map pane includes a surface map of an airport and a layer menu including deicing areas, airport configurations, runway closure status, braking action, RVR, or any combination thereof. The advisory pane includes advisories pulled from at least one air traffic or weather-related source. The messaging pane includes messages between groups of users.

In yet another embodiment, a computer program is embodied on a non-transitory computer-readable medium. The program is configured to cause at least one processor to display a plurality of interactive panes providing information pertinent to winter weather events to a user. The plurality of panes also include a primary map pane, a surface map pane, and a messaging pane. The primary map pane includes a geographic map of a geographical region with airport designations. The surface map pane comprises a surface map of an airport. The messaging pane includes messages between groups of users. When the user selects one of the airport designations of the primary map panel, the program is further configured to cause the at least one processor to update the surface map pane and the messaging pane based on the selected airport.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 4C illustrates screenshots of the primary map pane showing Quickview functionality, according to an embodiment of the present invention.

FIG. 5B is a screenshot illustrating a Quicklink menu of the advisory pane, according to an embodiment of the present invention.

FIG. 6A is a screenshot illustrating a surface map pane, according to an embodiment of the present invention.

FIG. 8 illustrates a process for flagging an item and notifying another user, according to an embodiment of the present invention.

DETAILED DESCRIPTION OF THE EMBODIMENTS

Figure 1:
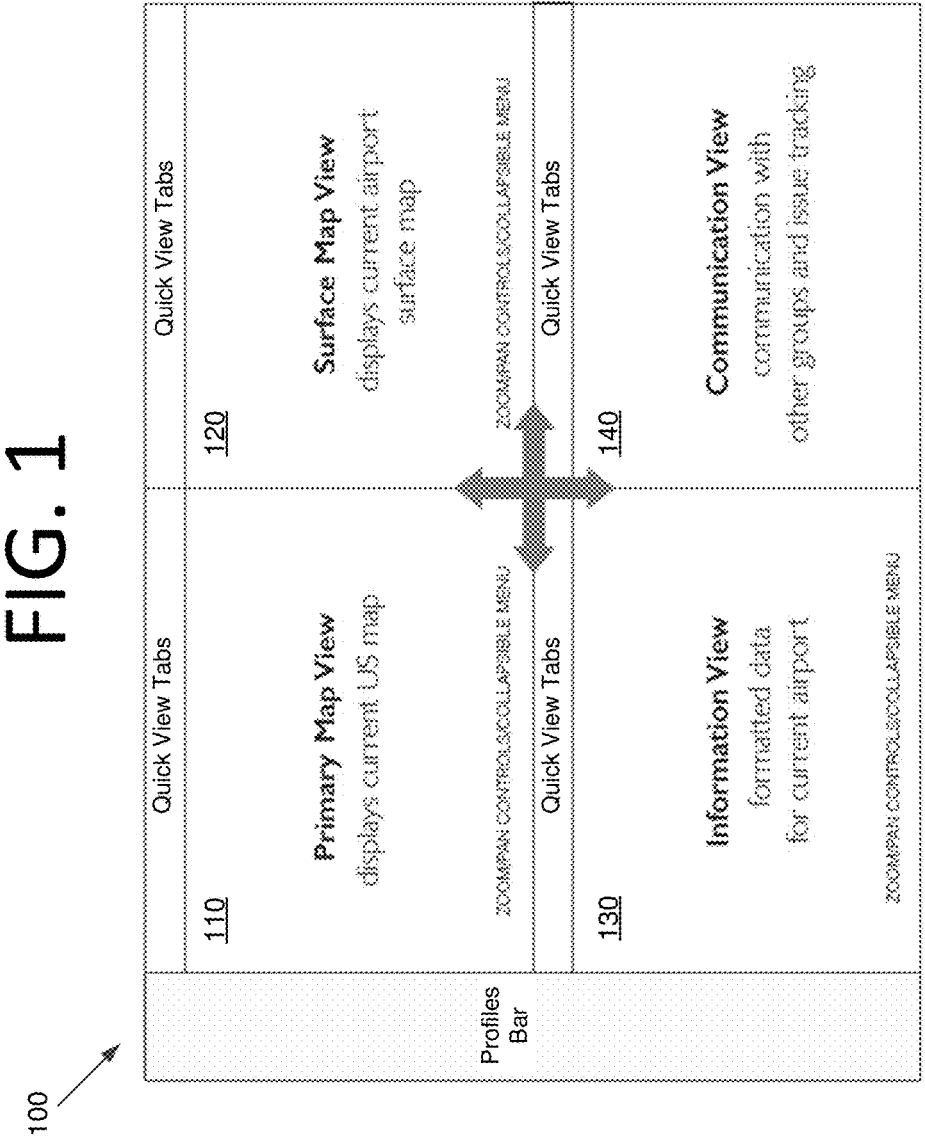
FIG. 1 is an architectural diagram illustrating a screen layout of a flight awareness collaboration application, according to an embodiment of the present invention.

Some embodiments of the present invention pertain to a software tool that assists airline dispatchers and other professionals in management of winter weather events at airports. The flight awareness collaboration tool (FACT) of some embodiments may gather pertinent weather information, air traffic information, airport information, and any other suitable information onto one display screen. FACT in some embodiments can be used by airline dispatchers to manage the airline fleet prior to, and during the day of, a winter weather event. FACT may also have built-in automation tools that can predict the impact of winter weather on airport capacity. FACT may be designed to support collaboration between the airline dispatcher, the air traffic control tower, the airport authority, and de-icing operators on the ground in some embodiments.

In some embodiments, FACT helps to reduce the number of unnecessary flight cancellations by improving situational awareness of impeding winter weather events and their effects on airports, providing data that assists in decision making, and promoting collaboration between the individuals and organizations involved in managing flight and airport operations. For instance, FACT may predict changes in departure rates based on a slowdown in departures, and this may help dispatchers and airport personnel in flight planning. Unnecessary cancellations may be prevented by having real-time information. If staff have good information on when a runway will open again, for instance, they may simply delay a flight rather than cancelling it altogether. As such, some embodiments may assist with predicting delays and cancellations on the day of a storm.

In some embodiments, FACT may provide tactical information that assists staff. For instance, the system may provide information pertaining to icing at different altitudes, locations of deicing trucks, whether runway is being cleared, etc. Deicing crews and other staff may collaborate to manage operations during a winter weather event. No such capabilities previously existed. Rather, disparate staff members tried to manage operations via email or phone, which did not adequately share information or facilitate tactical operations. FACT presents a new mechanism for presenting information and managing operations that provides different functionality in addition to doing substantially more, being more flexible, and more effective than any phone or email-based approach. FACT also improves operational efficiency.

Different entities have different roles in managing airport operations. For instance, the airport authority makes the determination of whether to keep the airport open or closed, the air traffic controllers manage flights (and may hold aircraft on the ground), dispatchers at the airline operation centers manage which planes take off and when, the ground crews clear runways and perform deicing, etc. Redirecting of aircraft, ground stops, etc. is orchestrated by a regional Federal Aviation Administration (FAA) Air Route Traffic Control Center (ARTCC). The various staff members should work together to effectively manage operations during a storm. For instance, if air traffic controllers are informed that braking action is getting worse on landing during a storm, they may close one or more runways and relay this information so that ground crews can clear closed runways. When snow removal is finished, the airport authority can issue a message and the cleared runway may be used once again.

FIG. 1 is an architectural diagram illustrating a screen layout 100 of a flight awareness collaboration application, according to an embodiment of the present invention. Layout 100 is divided into four panes 110, 120, 130, 140 organized as quadrants. Each pane is tabbed so views and information can be changed as desired by the user. Primary map view pane 110 displays a current map (e.g., a map of the U.S.) that may display airports, planes in the air, weather, etc. Surface map pane 120 displays the current airport surface map, which may include terminals, runways, gates, planes, etc. Information view pane 130 shows advisories for the current airport. Communication view pane 140 displays messages sent by various users for sharing information and issue tracking.

Figure 2:
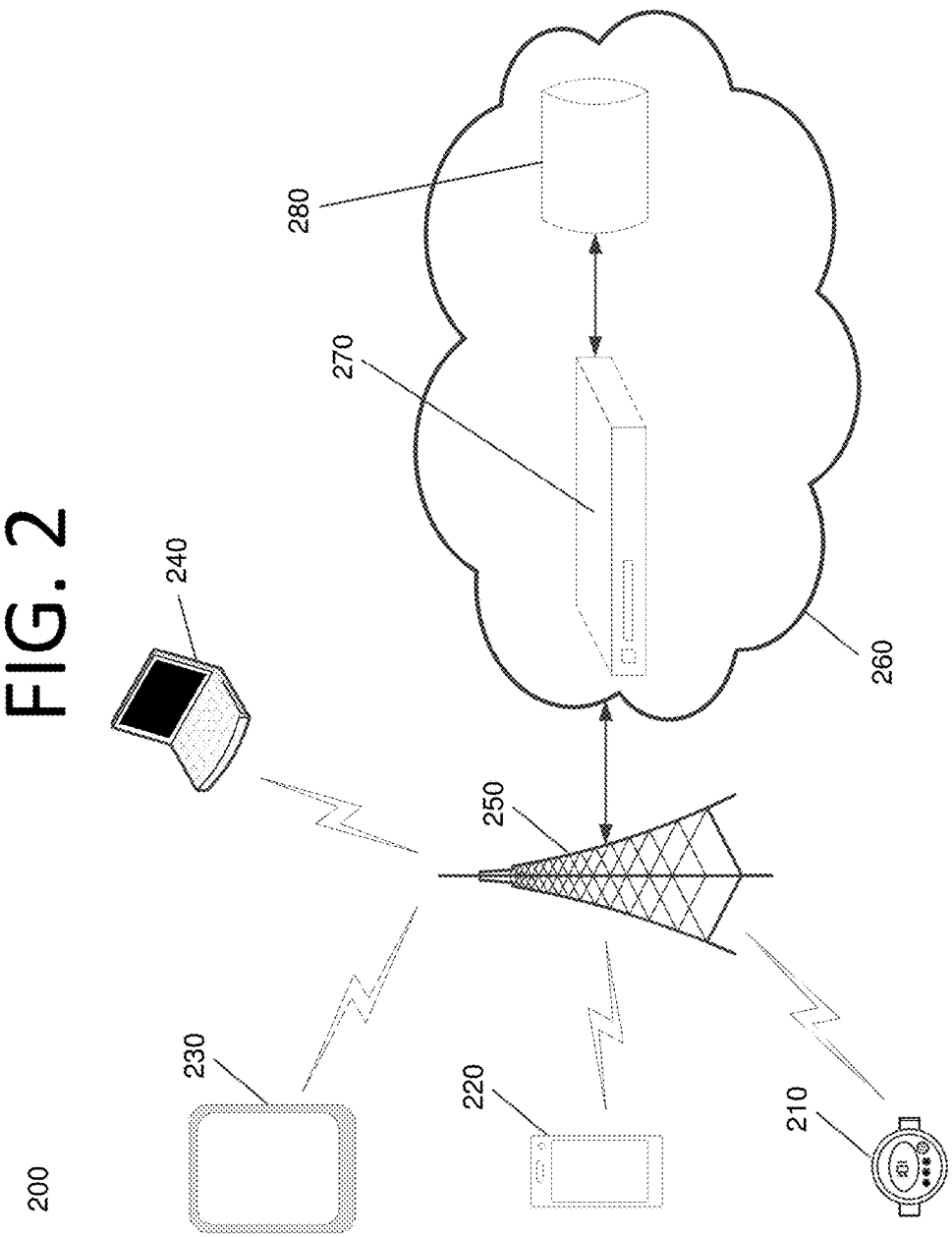
FIG. 2 is an architectural diagram illustrating a network configured to implement FACT applications, according to an embodiment of the present invention.

FIG. 2 is an architectural diagram illustrating a network 200 configured to implement FACT applications, according to an embodiment of the present invention. Network 200 includes a smart watch 210, a mobile phone 220, a tablet computer 230, a laptop computer 240, a base station 240, the Internet 260, and a server 270. While the communications here are shown as wireless, in some embodiments, wired communications may also be used for one or more of the communication links. Also, Ethernet, Wi-Fi, Bluetooth™, cable, any other suitable communications technology, or any combination thereof, may be used without deviating from the scope of the invention. Indeed, any local area network (LAN), wide area network (WAN), or Internet technology may be used supplemental to, or in place of, the network depicted herein.

Users of smart watch 210, mobile phone 220, tablet computer 230, and laptop computer 240 (e.g., airline dispatchers, air traffic control tower staff, airport authority staff, de-icing operators on the ground, etc.) use a FACT client application running thereon. The FACT application may be custom-tailored for the specific hardware capabilities, display constraints, etc. of each device. In FIG. 2, smart watch 210, mobile phone 220, tablet computer 230, and laptop computer 240 communicate with Internet 260 via base station 250. Base station 250 communicates with the Internet 260 via a telecommunications network, which may be any suitable telecommunications network, such as those of any currently available commercial carrier or combination of carriers. The telecommunications network may utilize any suitable standards and technologies, such as enhanced Node Bs, Radio Network Controllers (RNCs), 3G, 4G, 5G, etc. For the sake of convenience, the details of the telecommunications network are not shown, and the details of the Internet 260 are abstracted here, but may have any desired architecture without deviating from the scope of the invention.

Within or otherwise accessible by Internet 260 is a server 270 that runs a server-side implementation of the FACT application. For instance, the server-side FACT application may gather pertinent weather information, air traffic information, airport information, communications from users, etc., and store/update them in a database 280. The server-side FACT application may gather weather, air traffic, and airport data periodically and send updates to smart watch 210, mobile phone 220, tablet computer 230, and laptop computer 240. Server-side FACT application may also push communications received from a user out to client-side FACT applications of a group of users, or all users, when they are received.

Data may be provided to the server-side FACT application by a variety of sources including, but not limited to, the Federal Aviation Administration System Wide Information Management (SWIM) data feed, web services from the National Weather Service, etc. This data is collected, programmatically parsed, and, in some embodiments, simplified. The data may then be presented to users through the client-side FACT user interface.

Figure 3:
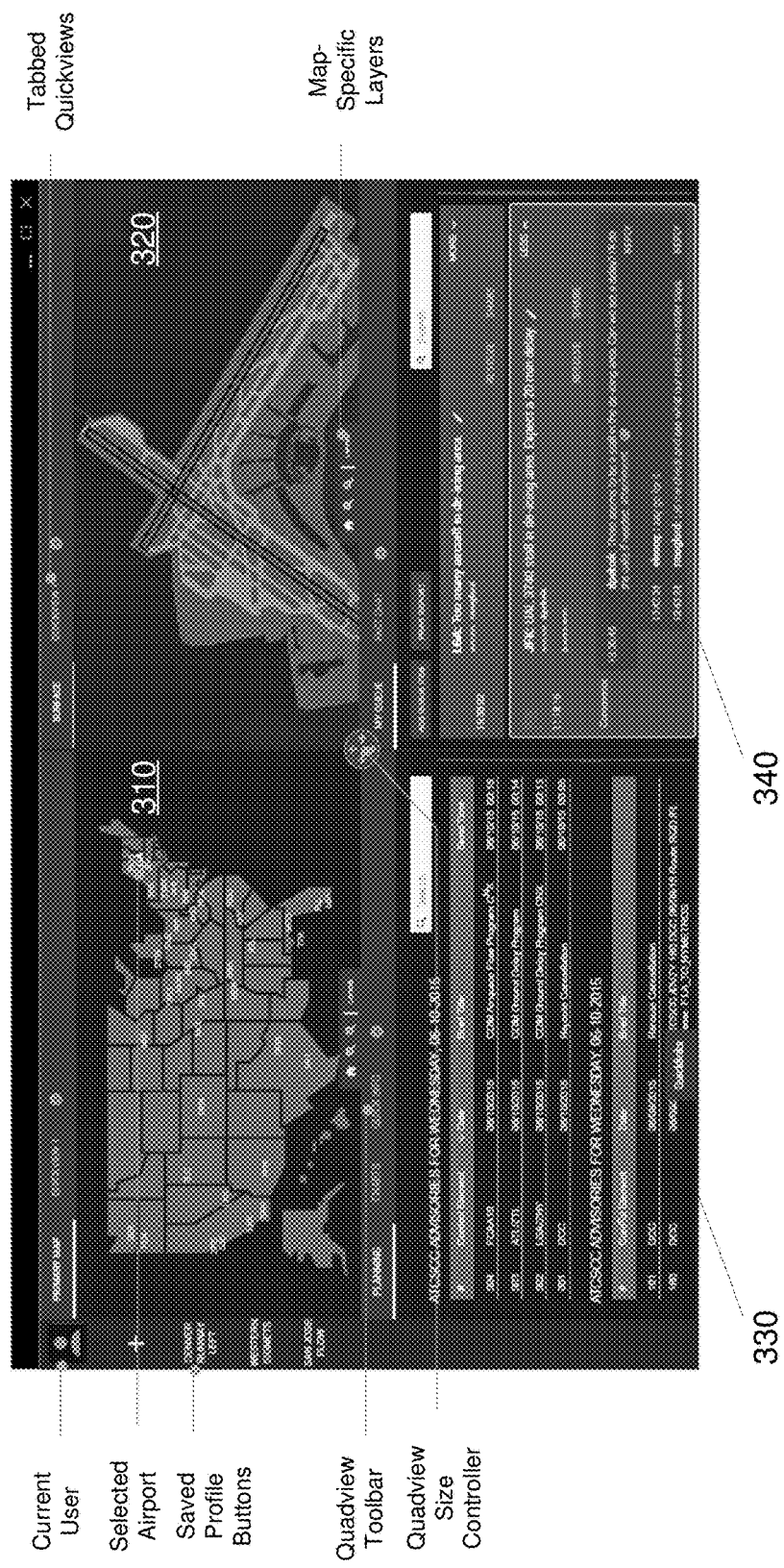
FIG. 3 is a screenshot illustrating a client-side FACT application, according to an embodiment of the present invention.

FIG. 3 is a screenshot illustrating a client-side FACT application 300, according to an embodiment of the present invention. As with FIG. 1, the display of FACT application 300 is divided into four quadrant-style panes 310, 320, 330, 340. Pane 310 shows the U.S. map, pane 320 shows an airport surface map, pane 330 shows various advisories, and pane 340 shows messages from various staff.

Figure 4A:
FIG. 4A is a screenshot illustrating a primary map pane, according to an embodiment of the present invention.

FIG. 4A is a screenshot illustrating a primary map pane 400, according to an embodiment of the present invention. Primary map pane 400 shows various airports in this view, with New York's LaGuardia (LGA) as the selected airport. Various user-created saved profile buttons, such as Denver Runway Left, are included on the left side.

Primary map pane 400 has selectable airports that define the data in the other three panes in this embodiment. Only one airport is selectable at a time in primary map pane. The Quickview tab can be used for different views of the same map data, but only the first tab map has selectable airports in some embodiments. Selecting a new airport from this view, assuming the screens have been changed from a current profile, may raise a modal panel asking if the user wishes to save the current QuadViews as a profile in some embodiments.

Figure 4B:
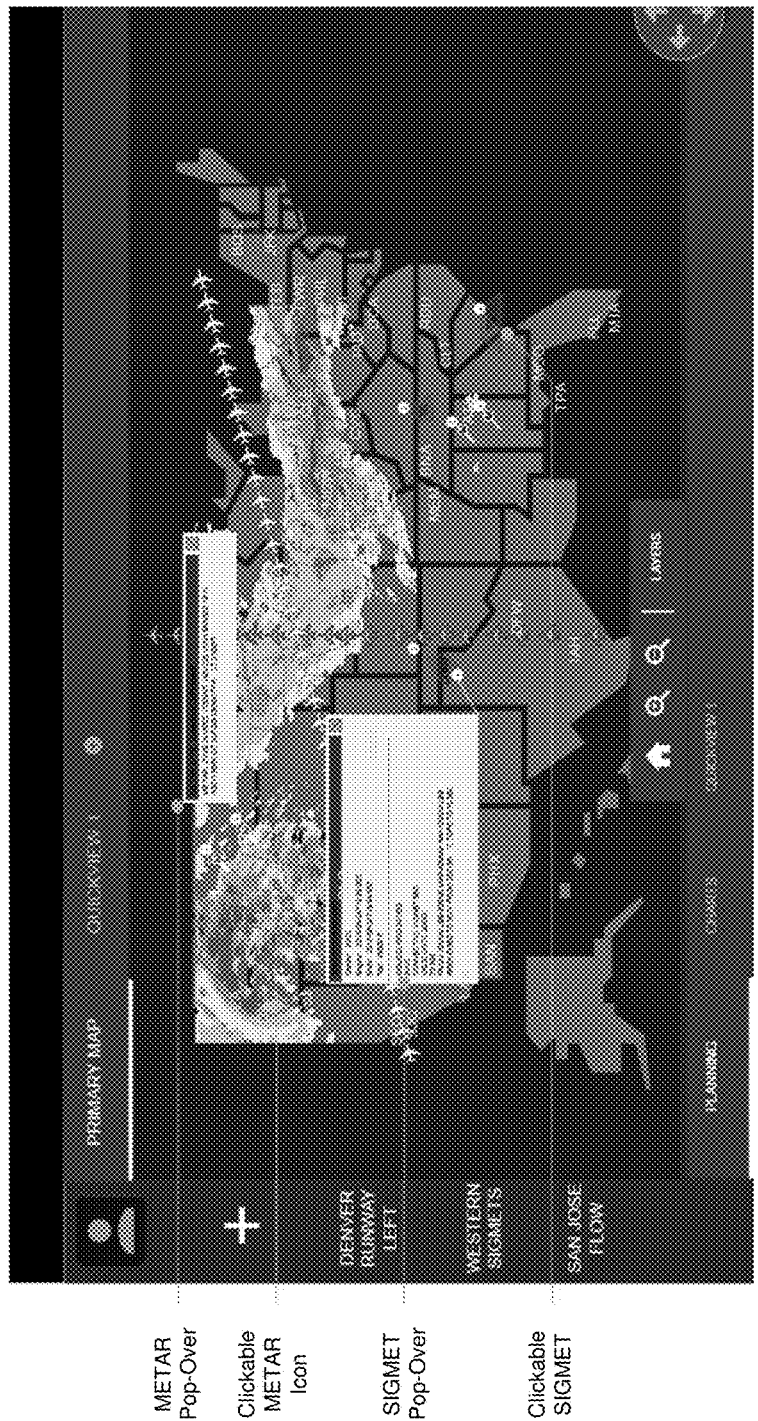
FIG. 4B is a screenshot illustrating another view of the primary map pane, according to an embodiment of the present invention.

FIG. 4B is a screenshot illustrating another view of primary map pane 400, according to an embodiment of the present invention. In this view, primary map pane 400 includes a Meteorological Aerodrome Report (METAR) pop-over and clickable METAR icons. METAR is a commonly accepted format for reporting weather information. Primary map pane 400 also includes a SIGMET pop-over and clickable SIGMET icons. SIGMET (Significant Meteorological Information) is a weather advisory that contains meteorological information concerning the safety of all aircraft. SIGMETs may be convective or non-convective.

Various views may also be custom-saved by the user. For instance, FIG. 4C illustrates this functionality in primary map pane 400. To gain access to alternate zoom levels, panned areas and layers on primary map pane 400 and the surface map pane (see, e.g., surface map pane 600 of FIGS. 6A-C), the user can create a new Quickview tab and manipulate it independently. For instance, when the user clicks Quickview 1, primary map pane 400 displays the zoomed in portion of the map shown in the lower screenshot. When a new airport is selected in primary map pane 400, the user may be prompted to save the current configuration, and then all views may return to their default states and additional open tabs may be closed.

Figure 4D:
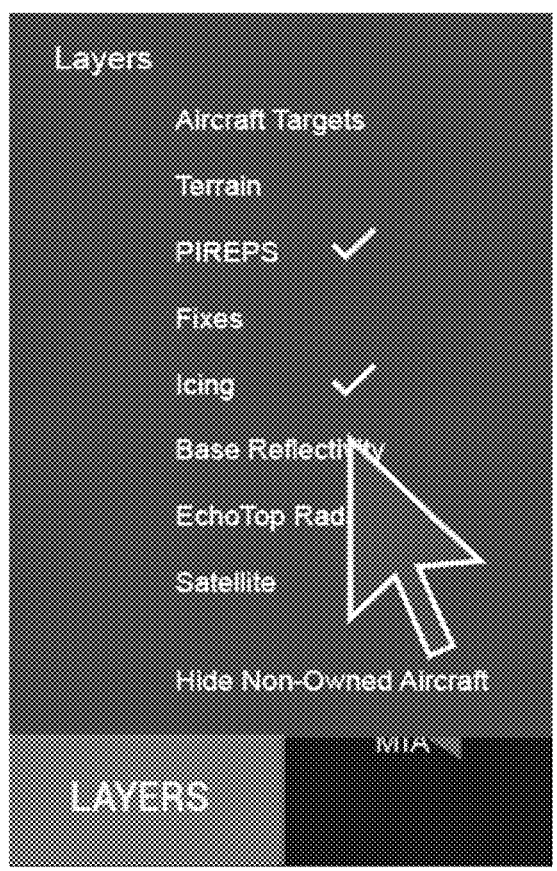
FIG. 4D is a screenshot illustrating layer selection in the primary map pane, according to an embodiment of the present invention.

Various layers may also be selected for primary map pane 400, as shown in layer selection menu 410 of FIG. 4D. These layers will affect what is displayed. For instance, aircraft targets, pilot reports (PIREPS), fixes, icing, base reflectivity, echo top radar, and satellite views may be displayed. Users may also hide non-owned aircraft. For instance, a dispatcher for American Airlinesx may only want to see his or her company's aircraft.

Figure 5A:
FIG. 5A is a screenshot illustrating an advisory pane, according to an embodiment of the present invention.
Figure 5B:
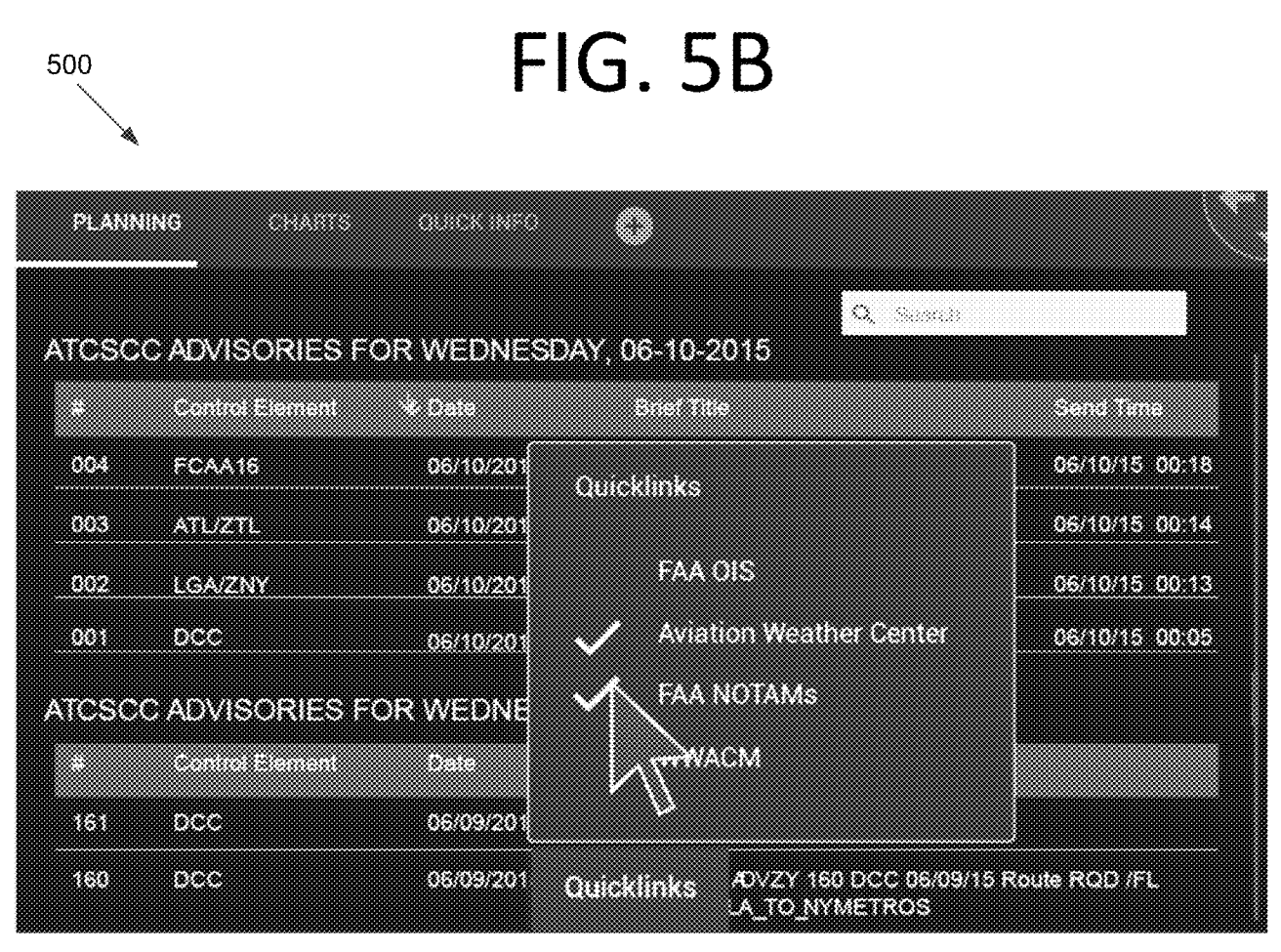

FACT also displays various advisories in some embodiments, as shown in advisory pane 500 of FIGS. 5A and 5B. For instance, this may include curated information about the currently selected airport. By clicking the Quicklinks button, the user can select which advisory sources he or she wishes to see. As with the map panes, the user can also create and save Quickviews for advisory pane 500. Charts can also be displayed in advisory pane 500, as shown in FIG. 5C.

Figure 5C:
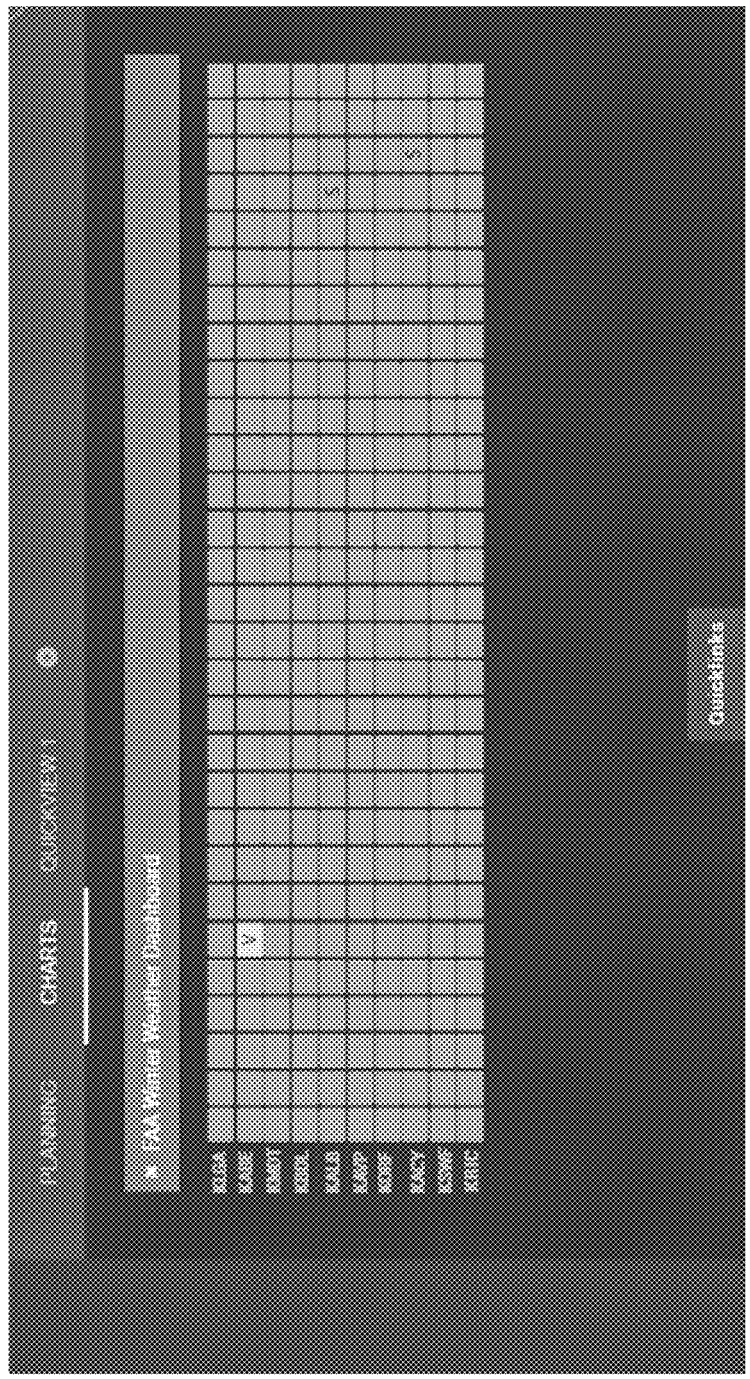
FIG. 5C is a screenshot illustrating a charts tab for the advisory pane, according to an embodiment of the present invention.

In FIG. 5C, a tool referred to as the "Aviation Winter Weather Dashboard" (AWWD), generated by the FAA, is being fed to FACT and then condensed and displayed as a single chart. This this tool was developed by the FAA's Collaborative Decision Making Weather Evaluation Team, in cooperation with the National Business Aircraft Association and other industry groups. The AWWD is a winter weather decision-making tool for aircraft operators. It is an at-a-glance display for determining potential winter weather impacts across the National Airspace System (NAS) within the next 84 hours. Based on the Short-range Ensemble Forecast Product, AWWD is updated every six hours, focusing on snowfall, freezing rain, and visibility issues. The color-coding of the three-hour blocks identifies where there is expected to be a nominal (green), slight (yellow), moderate (orange), or high (red) impact event. Due to the grayscale conversion, the specific colors are not shown here.

It should be noted that advisory pane 500 behaves differently from other panes in some embodiments. In these views, any link in the current airport's primary tab that requires a new window may be opened in a Quickview tab. There may be a maximum number of Quickview tabs available to the user (e.g., four tabs) in addition to the current airport's primary tab in some embodiments.

Figure 6B:
FIG. 6B is a screenshot illustrating the surface map pane with the aircraft layer displayed, according to an embodiment of the present invention.
Figure 6C:
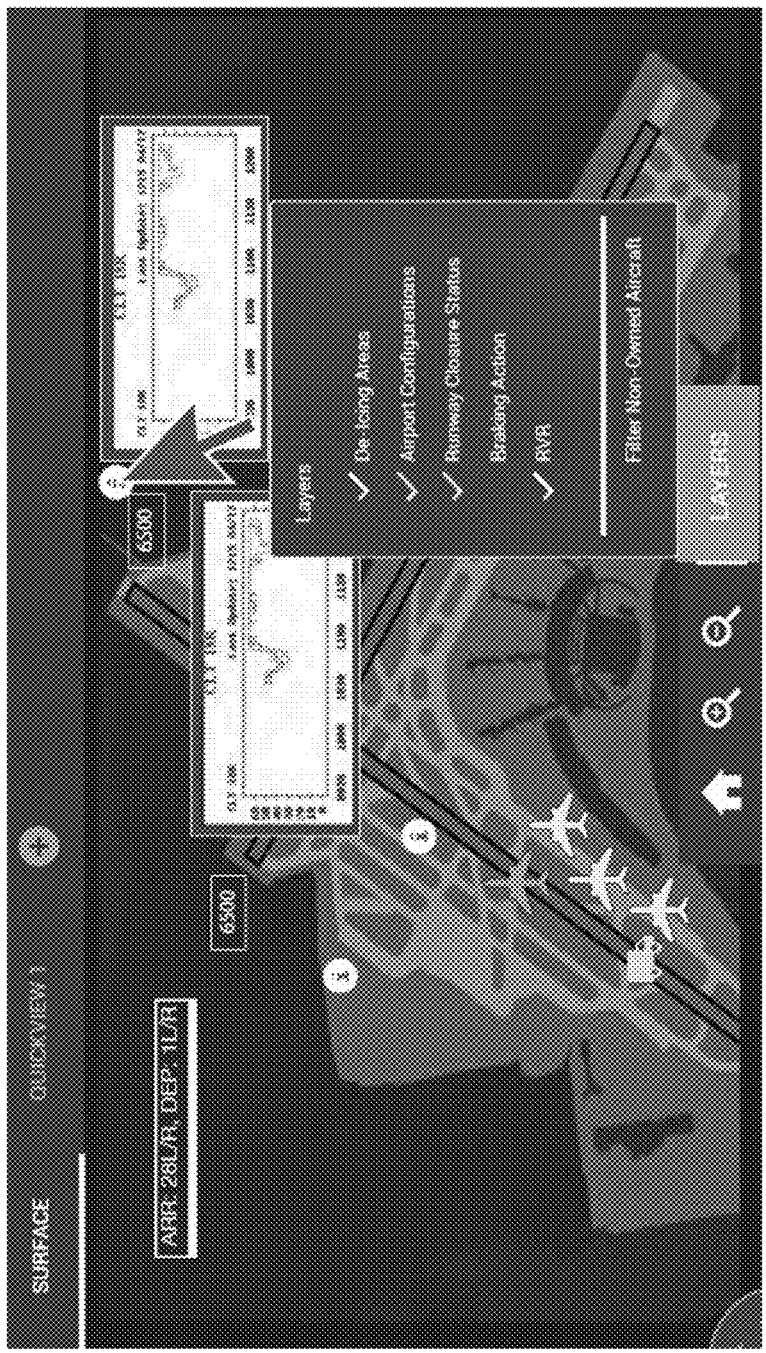
FIG. 6C is a screenshot illustrating the surface map pane with the layer selection menu open, according to an embodiment of the present invention.

Airport surface maps may be displayed in a surface map pane, such as surface map pane 600 of FIGS. 6A-C. In this embodiment, the map in surface map pane may be zoomed and manipulated independently. As shown in FIG. 6C, the layers in this embodiment include deicing areas, airport configurations, runway closure status, braking action, and RVR. The Runway Visual Range (RVR) is required to support precision landing and takeoff operations in the NAS. The system measures visibility, background luminance, and runway light intensity to determine the distance a pilot should be able to see down the runway. The user may also filter our non-owned aircraft.

Figure 7A:
FIG. 7A is a screenshot illustrating a messaging pane, according to an embodiment of the present invention.
Figure 7B:
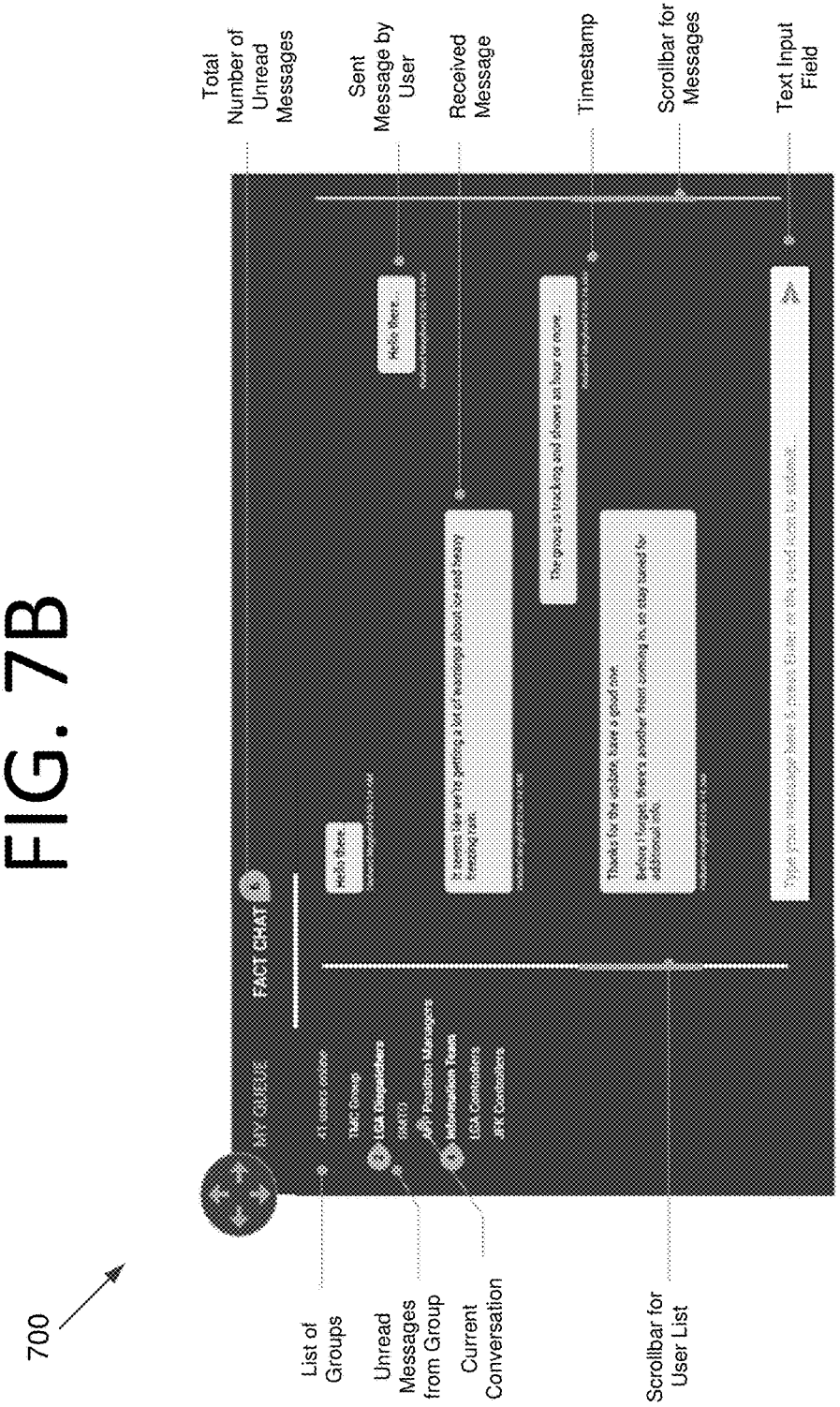
FIG. 7B is a screenshot illustrating a chat view of the messaging pane, according to an embodiment of the present invention.

FACT also includes a messaging pane in some embodiments, such as messaging pane 700 of FIGS. 7A and 7B. In this embodiment, the queue view allows the user to add custom items to the queue. Groups/users with whom the information is shared and comments among the users are also shown. The user may search for text, generate a report of flagged items, resolve issues, delete issues, and share issues, for example.

Messaging pane 700 also includes a chat view. See FIG. 7B. In this embodiment, the chat view shows a list of groups, the number of unread messages from each group, and the current conversation. For the currently selected conversation, messages sent by the user, and those received from other users, are displayed.

FIG. 8 illustrates a process 800 for flagging an item and notifying another user, according to an embodiment of the present invention. The process shows one user, User A, flagging an item, which is then provided to another user, User B, in the form of a notification. In this example, User A clicks a flag on the surface map pane. Flags are set by a FACT user in some embodiments, and then selectively shared with other FACT users in order to call out important information. Flags can also be created by the local user and not shared.

A menu then pops up, and User A selects an item from the menu. For instance, User A may choose to flag the item and send it to the queue in the messaging pane. The user can then create notes and send notifications to other users.

Once User A creates and submits the notification, other users, such as User B, receive the notification in their respective messaging panes. User B then clocks the notification. This causes a shared view to appear in a new tab, or alternatively, the view may be shown as a screenshot. The surface map may be provided to FACT SWIM. The map may be shared by many users in the FAA and fed to FACT. In this example, a particular area of the map is being selected and brought to the attention of other FACT users, which is unique to the FACT tool. The surface map can also be selected by the local user and not shared as, for one example, a reminder to take an action. All current maps and charts in FACT are aggregated from external sources in some embodiments.

Figure 9A:
FIG. 9A is a screenshot illustrating a surface map pane and a messaging pane of a FACT application, according to an embodiment of the present invention.
Figure 9B:
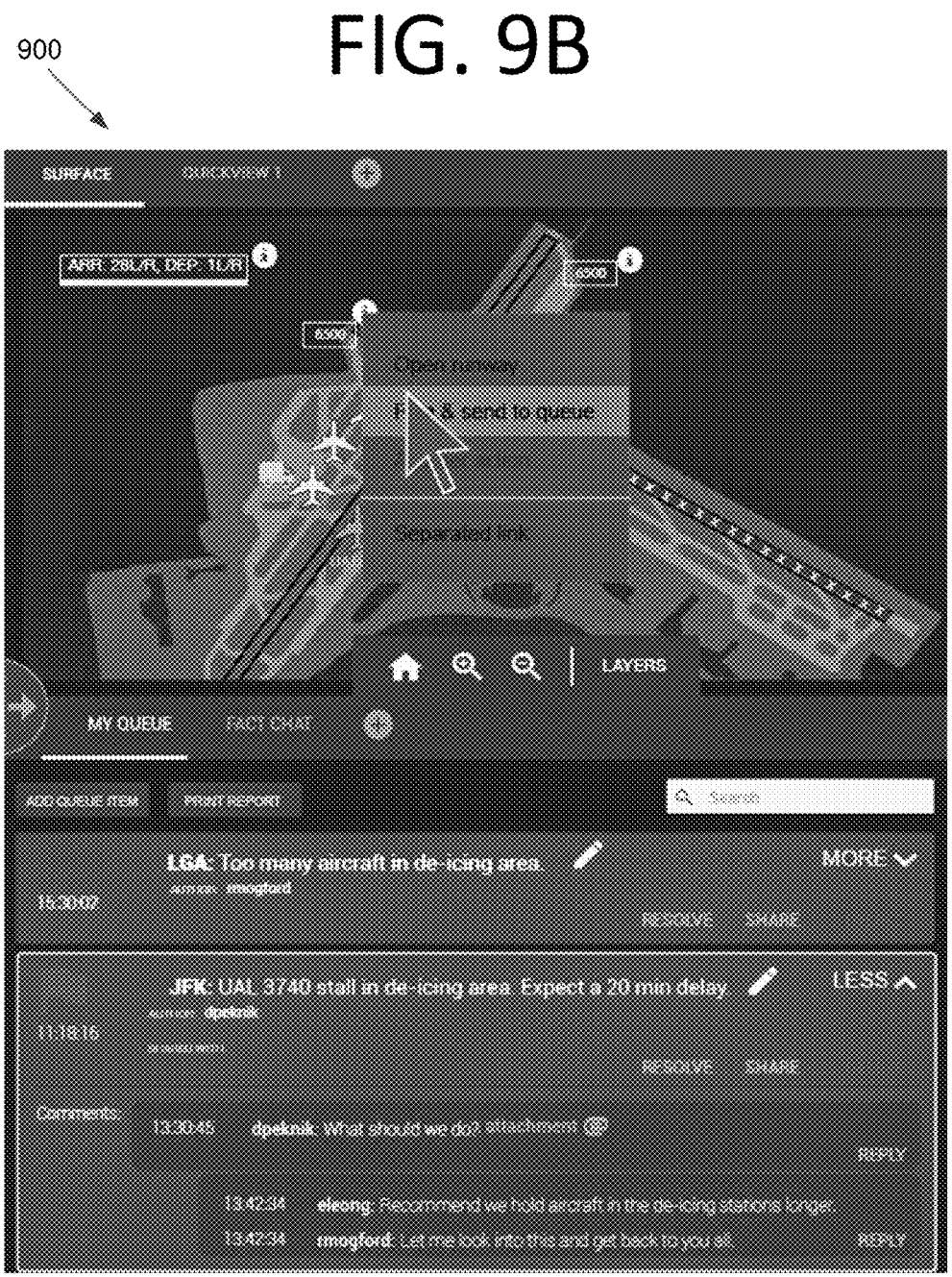
FIG. 9B is a screenshot illustrating the surface map pane and messaging pane of the FACT application with an options menu displayed, according to an embodiment of the present invention.
Figure 9C:
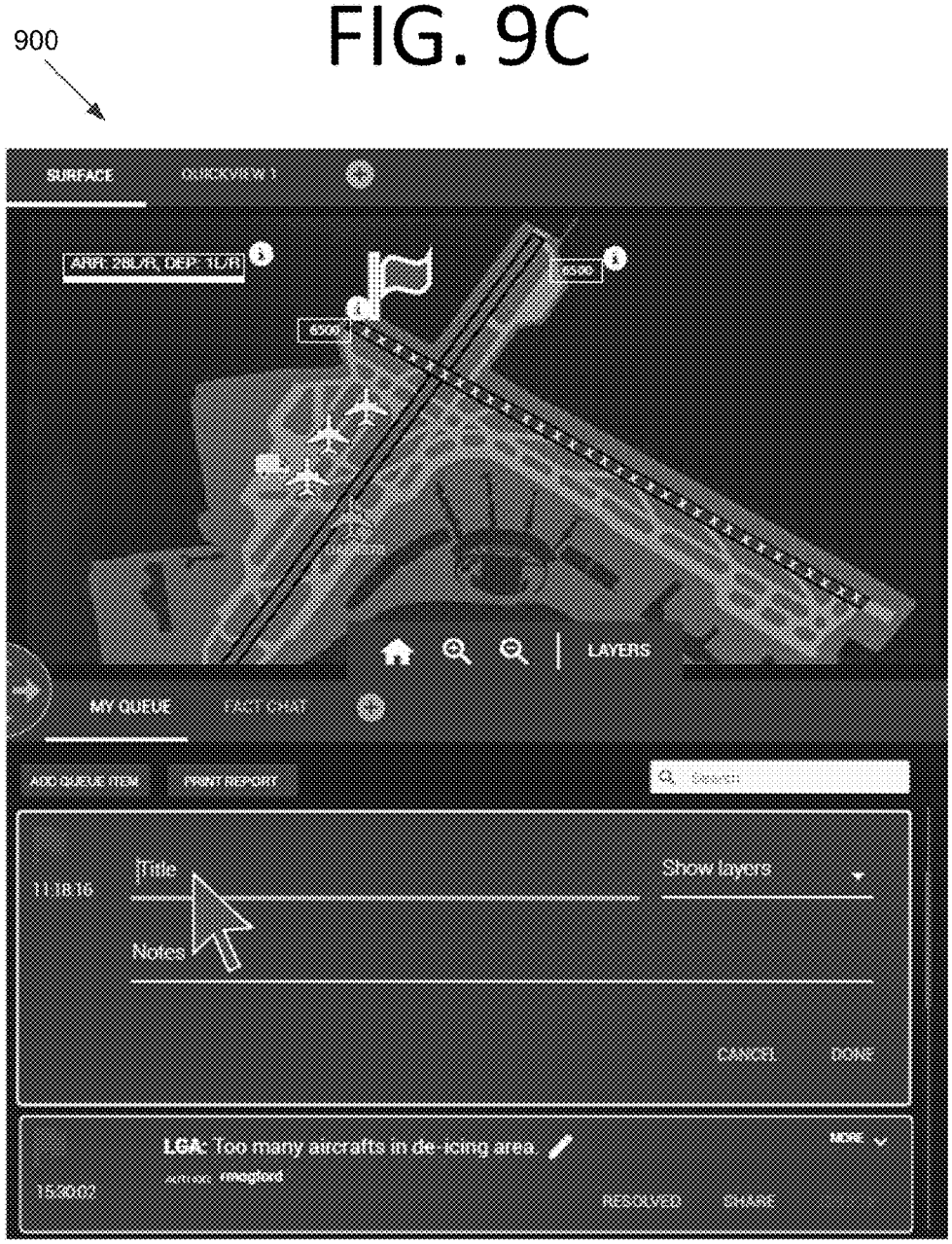
FIG. 9C is a screenshot illustrating the surface map pane and messaging pane of the FACT application with a new queue item creation view displayed in the messaging pane, according to an embodiment of the present invention.
Figure 10:
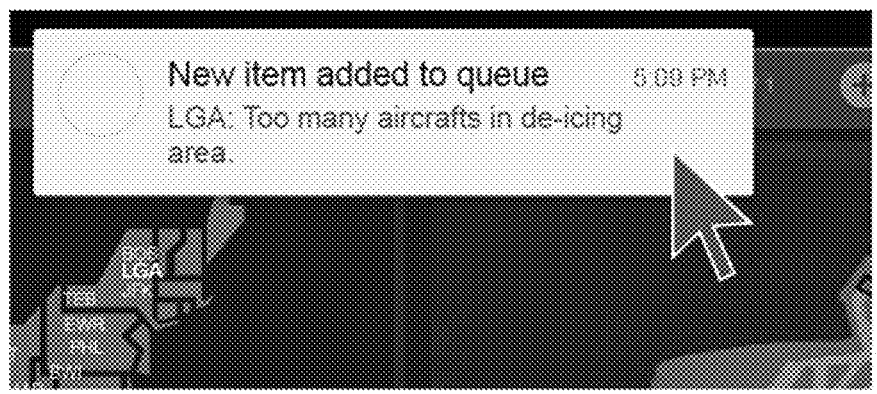
FIG. 10 is a screenshot illustrating a notification that is provided after a new queue item is created, according to an embodiment of the present invention.

Surface map/messaging panes 900 in FIGS. 9A-C provide further details regarding a potential implementation of this process. The user selects a flag corresponding to a queue item (e.g., a queue item pertaining to the runway being closed). See FIG. 9A. A contextual menu is then displayed with various options, including "Flag & send to queue". See FIG. 9B. Selecting this option automatically opens a new queue item view in the messaging pane. The user then creates the queue item, which is then sent to other users when the user selects the Share button. In some embodiments, FACT may provide automated queue items, flags, or messages, perhaps using machine learning. Once the new item is created and shared, a notification 1000 appears. See FIG. 10.

Figure 11:
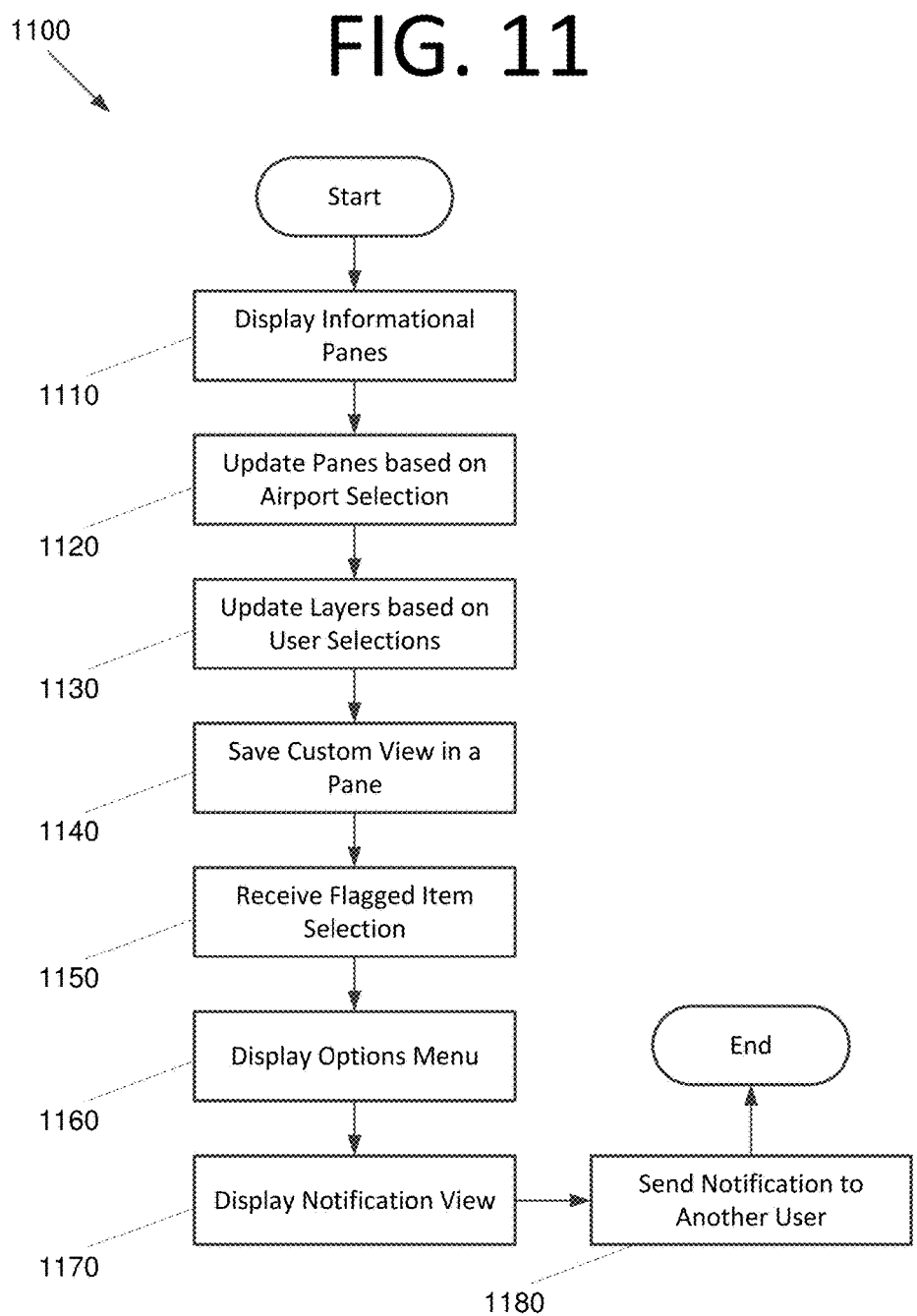
FIG. 11 is a flowchart illustrating a process carried out by an application for providing winter weather event information and coordinating activities between users, according to an embodiment of the present invention.

FIG. 11 is a flowchart 1100 illustrating a process carried out by an application for providing winder weather event information and coordinating activities between users, according to an embodiment of the present invention. The process begins with displaying informational panes at 1110. These informational panes include a primary map pane, a surface map pane, an advisory pane, and a messaging pane in some embodiments. Once the user selects an airport on the primary map pane, the surface map pane, advisory pane, and messaging pane are updated based on the airport at 1120.

The user may select one or more layers for display in the primary map pane, the surface map pane, or both. The application then updates the primary map pane and/or surface map pane based on the user's selection(s) at 1130. The user may decide to save a custom Quickview in a pane, and the application does so based on the user's selection at 1140.

Notification functionality is also provided. The FACT application receives a selection of a flagged item from the user at 1150 and responsive thereto, displays a menu including options pertaining to the selected flag at 1160. The options include an option to create a note to be sent to other users. The FACT application then displays a notification view where the user can enter information for the note at 1170. Once the note is created, the FACT application sends the note to at least one other user at 1180.

Figure 12:
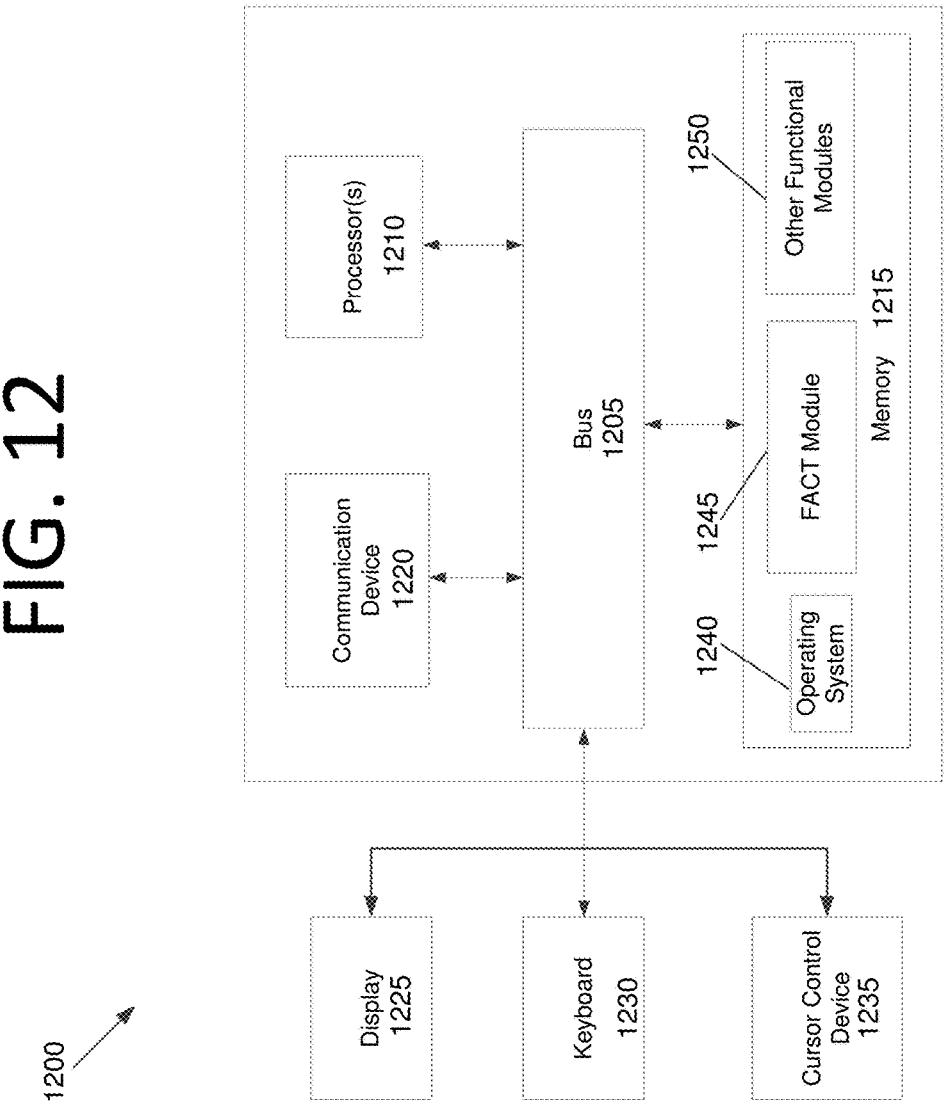
FIG. 12 is a block diagram of a computing system configured to implement a FACT application, according to an embodiment of the present invention.

FIG. 12 is a block diagram of a computing system 1200 configured to implement a FACT application, according to an embodiment of the present invention. Computing system 1200 includes a bus 1205 or other communication mechanism for communicating information, and processor(s) 1210 coupled to bus 1205 for processing information. Processor(s) 1210 may be any type of general or specific purpose processor, including a central processing unit (CPU) or application specific integrated circuit (ASIC). Processor(s) 1210 may also have multiple processing cores, and at least some of the cores may be configured to perform specific functions. Computing system 1200 further includes a memory 1215 for storing information and instructions to be executed by processor(s) 1210. Memory 1215 can be comprised of any combination of random access memory (RAM), read only memory (ROM), flash memory, cache, static storage such as a magnetic or optical disk, or any other types of non-transitory computer-readable media or combinations thereof. Additionally, computing system 1200 includes a communication device 1220, such as a transceiver and antenna, to wirelessly provide access to a communications network.

Non-transitory computer-readable media may be any available media that can be accessed by processor(s) 1210 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 1210 are further coupled via bus 1205 to a display 1225, such as a Liquid Crystal Display (LCD), for displaying information to a user. A keyboard 1230 and a cursor control device 1235, such as a computer mouse, are further coupled to bus 1205 to enable a user to interface with computing system. However, in certain embodiments such as those for mobile computing implementations, a physical keyboard and mouse may not be present, and the user may interact with the device solely through display 1225 and/or a touchpad (not shown). Any type and combination of input devices may be used as a matter of design choice.

Memory 1215 stores software modules that provide functionality when executed by processor(s) 1210. The modules include an operating system 1240 for computing system 1200. The modules further include a FACT module 1245 that is configured to perform FACT functionality in accordance with the embodiments discussed herein. Computing system 1200 may include one or more additional functional modules 1250 that include additional functionality.

One skilled in the art will appreciate that a "system" could be embodied as an embedded computing system, a personal computer, a server, a console, a personal digital assistant (PDA), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The process steps performed in FIGS. 8 and 11 may be performed by a computer program, encoding instructions for the nonlinear adaptive processor to perform at least the processes described in FIGS. 8 and 11, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the processes described in FIGS. 8 and 11, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer program embodied on a non-transitory computer-readable medium, the program configured to cause at least one processor to:

display a plurality of interactive panes providing information pertinent to winter weather events to a user, the plurality of panes comprising a primary map pane, a surface map pane, an advisory pane, and a messaging pane in a quadrant layout; wherein the primary map pane comprises a geographic map of a geographical region with airport designations;

the surface map pane comprises a surface map of a current airport;

the advisory pane comprises advisories pulled from at least one air traffic or weather-related source related to said current airport; and the messaging pane comprises messages between groups of users;

wherein when the user selects one of the airport designations of the primary map pane, the program is further configured to cause the at least one processor to update the surface map pane, the advisory pane, and the messaging pane based on the selected airport.

2. The computer program of claim 1, wherein the primary map pane further comprises clickable METAR icons that cause respective METAR pop-overs to be displayed.

3. The computer program of claim 1, wherein the primary map pane further comprises clickable SIGMET icons that cause respective SIGMET pop-overs to be displayed.

4. The computer program of claim 1, wherein the primary map pane, the surface map pane, or both, comprise a layer menu, the layer menu comprising a plurality of layers that are displayed on the respective pane when the user selects each layer.

5. The computer program of claim 4, wherein the primary map pane layer menu comprises options for displaying aircraft targets, pilot reports (PIREPS), fixes, icing information, base reflectivity, radar information, satellite views, or any combination thereof.

6. The computer program of claim 4, wherein the surface map pane layer menu comprises deicing areas, airport configurations, runway closure status, braking action, RVR, or any combination thereof.

7. The computer program of claim 1, wherein the messaging pane comprises a queue showing groups of users and a plurality of notifications for each respective group when the respective group is selected.

8. The computer program of claim 7, wherein each notification comprises buttons to resolve issues, delete issues, and share issues.

9. The computer program of claim 1, wherein the messaging pane further comprises a chat view, the chat view comprising a list of groups, a number of unread messages from each group with unread messages, and a current conversation between members of a selected group.

10. The computer program of claim 1, wherein the program is further configured to cause the at least one processor to:
receive a selection of a flagged item from the user;
display a menu comprising options pertaining to the selected flag, the options comprising an option to create a note to be sent to other users;
display a notification view where the user can enter information for the note; and send the note to at least one other user.

11. A computer-implemented method, comprising:
displaying, by a computing system, a plurality of interactive panes providing information pertinent to winter weather events to a user, the plurality of panes comprising a primary map pane, a surface map pane, an advisory pane, and a messaging pane in a quadrant layout; wherein the primary map pane comprises a geographic map of a geographical region with airport designations and a layer menu comprising options for displaying aircraft targets, pilot reports (PIREPS), fixes, icing information, base reflectivity, radar information, satellite views, or any combination thereof;

the surface map pane comprises a surface map of a current airport and a layer menu comprising deicing areas, airport configurations, runway closure status, braking action, RVR, or any combination thereof;

the advisory pane comprises advisories pulled from at least one air traffic or weather-related source related to said current airport; and the messaging pane comprises messages between groups of users, wherein when the user selects one of the airport designations of the primary map pane, the method further comprises updating the surface map pane, the advisory pane, and the messaging pane based on the selected airport.

12. The computer-implemented method of claim 11, wherein the primary map pane further comprises clickable METAR icons that cause respective METAR pop-overs to be displayed and clickable SIGMET icons that cause respective SIGMET pop-overs to be displayed.

13. The computer-implemented method of claim 11, wherein the messaging pane comprises a queue showing groups of users and a plurality of notifications for each respective group when the respective group is selected, and each notification comprises buttons to resolve issues, delete issues, and share issues.

14. The computer-implemented method of claim 11, wherein the messaging pane further comprises a chat view, the chat view comprising a list of groups, a number of unread messages from each group with unread messages, and a current conversation between members of a selected group.

15. The computer-implemented method claim 11, further comprising:
receiving, by the computing system, a selection of a flagged item from the user;
displaying, by the computing system, a menu comprising options pertaining to the selected flag, the options comprising an option to create a note to be sent to other users;
displaying, by the computing system, a notification view where the user can enter information for the note; and
sending, by the computing system, the note to at least one other user.

16. A system comprising one or more processors and a non-transitory computer-readable medium carrying at least one computer program, the computer program configured to cause at least one processor to:
display a plurality of interactive panes providing information pertinent to winter weather events to a user, the plurality of panes comprising a primary map pane, a surface map pane, and a messaging pane; wherein
the primary map pane comprises a geographic map of a geographical region with airport designations;
the surface map pane comprises a surface map of a current airport;
the messaging pane comprises messages related to said current airport between groups of users; and when the user selects one of the airport designations of the primary map pane, the program is further configured to cause the at least one processor to update the surface map pane and the messaging pane based on the selected airport.

17. The system of claim 16, wherein
the primary map pane and the surface map pane comprise a layer menu;
each layer menu comprises a plurality of layers that are displayed on the respective pane when the user selects each layer;
the primary map pane layer menu comprises options for displaying aircraft targets, pilot reports (PIREPS), fixes, icing information, base reflectivity, radar information, satellite views, or any combination thereof; and
the surface map pane layer menu comprises deicing areas, airport configurations, runway closure status, braking action, RVR, or any combination thereof.

18. The system of claim 16, wherein
the messaging pane comprises a queue showing groups of users and a plurality of notifications for each respective group when the respective group is selected;
each notification comprises buttons to resolve issues, delete issues, and share issues; and
the messaging pane further comprises a chat view, the chat view comprising a list of groups, a number of unread messages from each group with unread messages, and a current conversation between members of a selected group.

* * * * *

UNITED STATES PATENT AND TRADEMARK OFFICE
CERTIFICATE OF CORRECTION

PATENT NO. : 10,229,604 B1  
APPLICATION NO. : 15/639807  
DATED : March 12, 2019  
INVENTOR(S) : Mogford et al.

Page 1 of 1

It is certified that error appears in the above-identified patent and that said Letters Patent is hereby corrected as shown below:

On the Title Page

Item (72), add --Daniel Nicholas Peknik, Pacifica, CA (US)--

Signed and Sealed this  
Twentieth Day of October, 2020

Andrei Iancu  
*Director of the United States Patent and Trademark Office*